Nov. 4, 1969   G. B. SPRINGSTON, JR   3,475,846
NEKTON SAMPLER
Filed Jan. 26, 1968   2 Sheets-Sheet 1

INVENTOR
GEORGE B. SPRINGSTON, JR.
BY
ATTORNEYS

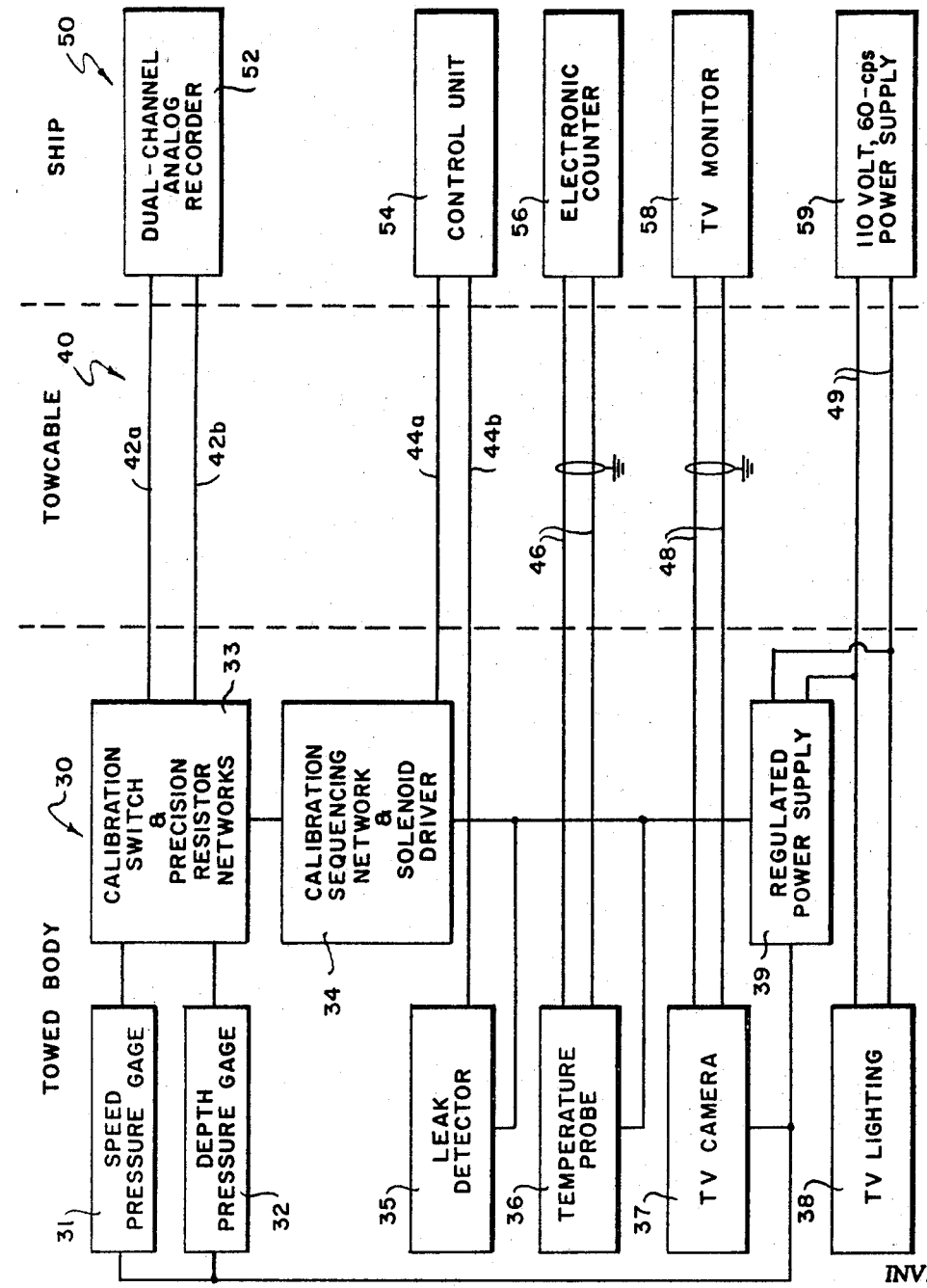

United States Patent Office 3,475,846
Patented Nov. 4, 1969

3,475,846
NEKTON SAMPLER
George B. Springston, Jr., Bethesda, Md., assignor to the United States of America as represented by the Secretary of the Navy
Filed Jan. 26, 1968, Ser. No. 700,990
Int. Cl. A01k 73/02
U.S. Cl. 43—9    9 Claims

ABSTRACT OF THE DISCLOSURE

A cable towed nekton sampler includes a towed body, a tow cable and suitable handling equipment aboard ship. The towed body contains special transducers for measuring the speed, depth and water temperature and houses a closed circuit television camera for observing the captured nekton during tow.

---

The invention described herein may be manufactured and used by or for the Government of the United States of America for governmental purposes without the payment of any royalties thereon or therefor.

Background of the invention

This invention relates to biological data acquisition systems and, more particularly, to a system for capturing marine organisms and gathering data thereon.

Devices have been known in the prior art which are capable of gathering data on marine organisms. However, researchers in the field have noted that such prior art devices were not capable of gathering certain types of nekton organisms. By way of definition, nekton are marine organisms which are capable of self-propulsion as contrasted with plankton which cannot propel themselves.

Examination of the contents of the stomachs of certain marine animals which have been captured have revealed certain types of nekton which have not been caught in existing samplers. One explanation of this phenomenon is that the existing samplers are not effective in catching these particular types of nekton. This explanation follows from the fact that existing nets are towed at slow speeds and the nekton in question could either avoid them or swim out of them.

Accordingly, it is an object of this invention to provide a novel type of marine life sampler which is towed at much higher speeds than previous known samplers.

Another object of this invention is to provide a novel type of sampler which permits trapping marine biological samples without damaging them and permits retention once they have been caught.

A further object of this invention is to provide a novel type of marine life sampler which contains instrumentation for measuring and recording the environmental conditions at the time of sampling.

These and other objects will become more fully understood from the following description, with reference to the accompanying drawings wherein:

Brief description of the drawings

FIG. 3 is a block diagram representation of the associated instrumentation for use with the sampler which comprises part of the invention.

Description of the preferred embodiment

Figure 1:
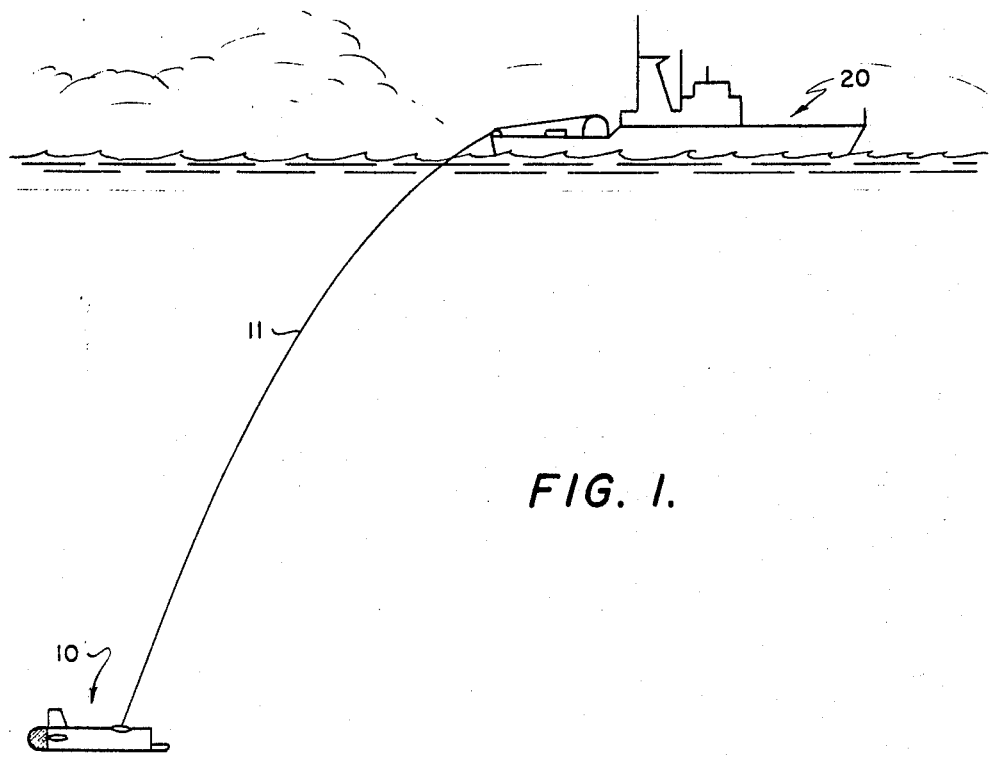
FIG. 1 is a diagramatic representation of the sampler in use.

Referring now to FIG. 1, the towed body 10 is adapted to be launched from and towed by a vessel 20 and is connected with the latter by means of a tow cable 11. Although vessel 20 is herein shown as a surface ship, it is to be understood that body 10 may be towed by other suitable vehicles such as a helicopter. Tow cable 11 provides mechanical as well as electrical connection between the towed body 10 and vessel 20 and may be of the double-armored type containing coaxial conductors as well as conventional stranded conductors, sealed in a waterproof jacket, submersible in seawater.

Figure 2:
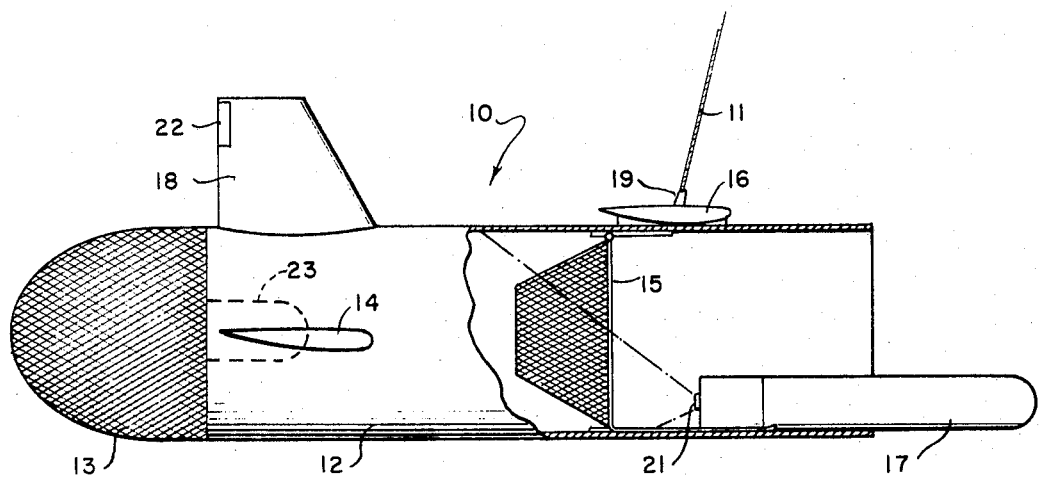
FIG. 2 is a partial sectional view of the towed body.

Referring now to FIG. 2 the towed body 10 comprises a generally cylindrical hollow container 12 having openings at each end thereof. Tow cable 11 permits electrical and mechanical connection to vessel 20 and is connected to the towed body 10 by means of a towstaff 19 suitably joined to cylinder 12 at the upper surface thereof, in its normally towed configuration. Mounted in proximity to towstaff 19 is a depressing wing 16 of suitable configuration. The tail assembly comprises the vertical tail 18 mounted in the rear portion of cylinder 12 and a horizontal tail 14. The tails 14 and 18 are fixedly mounted but may be provided with trim tabs to correct for minor asymmetries in fabrication, as for example trim tab 22 associated with vertical tail 18. Mounted within cylinder 12 is a front net 15 having an inwardly narrowing conical shape thereby allowing objects such as marine specimens to enter the rear portion of cylinder 12 while at the same time making escape difficult.

The rear portion of cylinder 12 is provided with a closed off rear net 13 for containing samples as well as a protecting body 23 having a blunt trailing edge for protecting entrapped nekton from inwardly flowing water by virtue of the dead water region to its rear. Rear net 13 permits water entering the front portion to exit. Mounted within cylinder 12 in the front portion thereof is an instrument container 17. Instrument container 17 which may be of generally cylindrical configuration and is fashioned waterproof, contains the apparatus with which measurements of the environmental conditions are carried out. The rearwardmost portion of instrument container 17 is provided with a television camera 21 for making visual observation of the rear portion of cylinder 12 containing the entrapped marine specimens.

Referring now to FIG. 3 the instrumentation electronics associated with the nekton sampler includes the towed body package 30 connected by means of tow cable 40 to the shipboard package 50.

The instrumentation contains provision for measuring and recording the speed, depth, and water temperature within the towed body 10 and a closed circuit television system to observe the specimens caught within the body while towing. The output signals of the measurement transducers and the television camera are transmitted from the towed body 10 to recorders in the shipboard package 50 as well as to a television monitor.

Towing speed is measured by means of a speed pressure gage 31. By way of example, speed pressure gage 31 may comprise a potentiometer-type, differential pressure, bellows-type transducer attached to a pitot static tube, not shown, mounted in the nose of the towed body 10. The ransducer may be located in the watertight instrument container 17 mounted in the bottom portion of the towed body 10. The pitot tube may be connected to the transducer by means of an oil filled tube which prevents sea-water from entering and damaging the internal parts of the transducer. The differential pressure from the pitot tube is proportional to the square of the towing speed but is independent of the towing depth. Although the electrical output of the transducer is a non-linear function, the speed can be determined with sufficient accuracy using the appropriate calibration data. The speed pressure gage 31 is connected to a calibration switch and precision resistor network 33 which in turn is connected to be calibration sequencing network and solenoid driver 34. Networks 33 and 34 provide an electrical zero reference and a sensitivity calibration of the transducer to assure maximum accuracy of the recorded data. The fundamental principals for this type of calibration network are contained in David Taylor Model Basin Report 2001, "The DTMB Mark I Measurement System for Cable-Towed Bodies," 1965, by Robert J. Singleton as well as in application Ser. No. 540,153 filed Mar. 31, 1966, entitled "Electronic Measurement System for use with Cable Towed Bodies," by Robert J. Singleton and assigned to the present assignee herein.

Briefly described, the calibration sequencing network 34 successively connects the resistors contained in network 33 for obtaining zero signal reference, full scale reference, transducer sensitivity reference, and the actual transducer measurement signal. The first two steps correspond to the lower and upper signal limits (zero and 100 percent of full scale) obtainable from the transducer, and are independent of the differential pressure acting on the transducer.

The third step adds an electrical signal to the signal emitted by the transducer. The amplitude of this signal will always represent a constant pressure differential, which is determined during the physical calibration of the transducer. The relation between this signal and the pressure differential depends only on the stability of the pressure gage potentiometer and the precision resistors in the calibration circuitry. The fourth step connects the speed pressure gage 31 to the recorder for a direct measurement of the transducer signal.

The calibration record thus obtained may be compared with previous calibration records made under controlled conditions and serving as a standard. This enables calibration to be made of the transducer system as a whole including and compensating for the mechanical as well as the electrical components thereof.

The four electrical steps are controlled by a solenoid operated switch driver 34 which is actuated by an electrical pulse from control unit 54 fed through cable 44a. The driver 34 is actuated to connect switch 33 through the various calibration steps.

The output signal of the speed pressure gage 31 is transmitted by means of cable wire 42a to one channel input of the dual channel analog recorder 52. The analog recorder 52, which may be of the graphic recorder type, provides a written record of the pressure response versus time.

The depth of the towed body is sensed by means of the depth pressure gage 32 which may be of the potentiometer-type, pressure transducer category, attached to the static hole of the pitot tube, heretofore mentioned, via an oil filled tube. The electrical output of gage 32 is a linear function of pressure, and hence, depth. The zero reference and calibration network for the depth gage 32 operates in the same manner as for the speed gage 31 with the connections thereof being similar. The output signal of the depth gage 32 is transmitted through cable wire 42b to the second channel of analog recorder 52.

The leak detector 35 is provided for giving an indication aboard the ship in the event of a water leak in the watertight instrumentation container 17. By way of example, the leak detector may comprise an open electrical circuit which is closed whenever sea water completes the electrical path between the two open ends of the electrical circuit. The leak detector 35 output signal is transmitted through cable wire 44b to control unit 54. A suitable indicator such as a lamp may be provided within control unit 54 whereby, if the electrical circuit is completed, the lamp will light.

The temperature of the water in the towed body is measured by means of the temperature probe 36. By way of example, the suitable temperature sensor would be a temperature-sensitive LC-cut crystal wafer and associated oscillator network. The resonant frequency of such a circuit increases with increasing temperature, which may be measured by means of a digital electronic counter 56 connected to the probe 36 by means of cable 46. Counter 56 may be designed so as to provide a digital readout of the temperature sensed. Furthermore, digital recording equipment may be connected to the counter to provide a permanent record of temperature variations with time.

A television camera 37 is mounted in the instrument container and is focused on the interior read portion of the towed body for visually monitoring the marine specimens entrapped therein. TV camera 37 is connected by means of cable 48 to a TV monitor 58 mounted aboard ship.

Illumination for the TV camera may be provided by means of electro-luminescent lamps which may be mounted about the interior periphery of the towed body at the rear portion thereof. The TV lighting system 38 is connected by means of cable 49 to a conventional 110-volt, 60 cycle power supply 59 aboard the ship. Connected to the 110-volt power supply 59 through cables 49 is a regulated power supply 39 for providing direct circuit voltage for driving the solenoid driver 34, the leak detector 35, temperature probe 36, TV camera 37, and the speed and depth gages 31, 32.

Having described the invention, it will be apparent that many modifications will be obvious to one skilled in the art.

What is claimed is:

1. A system for trapping marine biological samples and obtaining data thereon comprising:
   a hollow towed body means for trapping marine biological samples having front and rear portions;
   said front portion being provided with an opening having a first net mounted therein, said net having an opening therein of smaller cross sectional area than the interior of said body for allowing entry of said samples into the interior portion of said towed body;
   said rear portion being provided with an opening having a second net mounted therein and having a suitable mesh structure for permitting retention of said samples and allowing exit of water from said interior portion;
   a hydrodynamic tail assembly having a plurality of fins fixed to said towed body for improving the hydrodynamic stability of said towed body;
   tow cable attaching means capable of connecting said towed body to a tow cable connected to a towing vessel; and
   means mounted within said towed body for relieving the pressure of the water flow on the samples collected in said rear net.

2. A system for trapping marine biological samples and obtaining data thereon as set forth in claim 1 further comprising:
   a horizontally disposed depressing wing mounted on the front portion of said towed body; and
   an instrumentation package mounted within the interior of said towed body;
   said instrumentation package including a television camera for observing the interior portion of said towed body.

3. A system for trapping marine biological samples and obtaining data thereon as set forth in claim 2 wherein:
   said instrumentation package includes speed measuring means for measuring the speed of said towed body.

4. A system for trapping marine biological samples and obtaining data thereon as set forth in claim 3 wherein:
   said instrumentation package includes depth measuring means for measuring the depth of said towed body.

5. A system for trapping marine biological samples and obtaining data thereon as set forth in claim 4 further comprising:
   calibration means connected to said speed measuring means and to said depth measuring means for calibrating the respective measuring means according to local environmental conditions; and dual channel analog recording means connected to said calibration means for recording speed and depth measurements.

6. A system for trapping marine biological samples and obtaining data thereon as set forth in claim 5 further comprising:

leak detector means for detecting fluid leaks within said instrumentation package.

7. A system for trapping marine biological samples and obtaining data thereon as set forth in claim 6 further comprising:

temperature sensor means connected to electronic digital counter means for measuring the temperature of the interior of said towed body.

8. A system for trapping marine biological samples and obtaining data thereon as set forth in claim 7 further including:

television monitor means connected to said television camera;

said instrument package being electrically connected by means of a tow cable to associated indicating means mounted aboard a towing vessel.

9. A system for trapping marine biological samples as set forth in claim 1 in which said body is of substantially the same cross-section at both the front and rear portions, and in which said means for relieving the pressure of the water flow comprises a second body mounted centrally within said hollow body adjacent the downstream end and having a blunt configuration at its downstream end.

References Cited

UNITED STATES PATENTS

| 533,540 | 2/1895 | Larsen | 43—9 |
| 2,720,047 | 10/1955 | Isaacs | 43—7 |
| 2,765,565 | 10/1956 | Mussio | 43—9 |
| 2,821,805 | 2/1958 | Kunze | 43—17.1 |
| 3,297,980 | 1/1967 | Haslett | 43—17.1 X |

FOREIGN PATENTS 369,715  3/1932  Great Britain.

WARNER H. CAMP, Primary Examiner